(12) United States Patent
Reichert et al.

(10) Patent No.: US 12,736,794 B2
(45) Date of Patent: Sep. 15, 2026

(54) METHOD FOR OPERATING A MICROSCOPY SYSTEM, MICROSCOPY SYSTEM, AND CALIBRATION METHOD FOR A MICROSCOPY SYSTEM

(71) Applicant: Carl Zeiss Meditec AG, Jena (DE)

(72) Inventors: David Reichert, Vienna (AT); Marco Wilzbach, Rainau (DE); Stefan Saur, Aalen (DE); Christoph Hauger, Aalen (DE); Artur Hoegele, Oberkochen (DE); Mikael Timo Erkkilä, Vienna (AT); Holger Matz, Unterschneidheim (DE); Rainer Leitgeb, Vienna (AT); Angelika Unterhuber, Vienna (AT); Marco Andreana, Vienna (AT)

(73) Assignee: Carl Zeiss Meditec AG, Jena (DE)

( * ) Notice: Subject to any disclaimer, the term of this patent is extended or adjusted under 35 U.S.C. 154(b) by 45 days.

(21) Appl. No.: 18/532,818

(22) Filed: Dec. 7, 2023

(65) Prior Publication Data

US 2024/0111143 A1 Apr. 4, 2024

Related U.S. Application Data

(63) Continuation of application No. PCT/EP2022/064996, filed on Jun. 2, 2022.

(30) Foreign Application Priority Data

Jun. 7, 2021 (DE) .................... 10 2021 205 727.6

(51) Int. Cl.

*G02B 21/36* (2006.01)
*G02B 21/00* (2006.01)
*G02B 21/06* (2006.01)

(52) U.S. Cl.

CPC ....... *G02B 21/367* (2013.01); *G02B 21/0012* (2013.01); *G02B 21/06* (2013.01)

(58) Field of Classification Search

CPC .. G02B 21/367; G02B 21/0012; G02B 21/06; G02B 21/16
See application file for complete search history.

(56) References Cited

U.S. PATENT DOCUMENTS 5,995,867 A * 11/1999 Zavislan ............ G02B 21/0028 250/461.2
2011/0275932 A1* 11/2011 Leblond ............... A61B 5/0062 600/425

(Continued)

FOREIGN PATENT DOCUMENTS

EP 2347703 A1 7/2011

OTHER PUBLICATIONS

Hatami et al., "Fluorescence lifetime imagining microscopy for brain tumor image-guided surgery", Journal of Biomedical Optics, www.spiedigitallibrary.org/journals/Journal-of-Biomedical-Optics, (Oct. 7, 2010), pp. (056022-1)-(056022-5), vol. 15 (5), Paper 10290LRR, SPIE, University of California, Davis, Department of Biomedical Engineering. 451 Health Science Drive, GBSF, Davis, California, 95616, USA, in English.

(Continued)

*Primary Examiner* — Timothy R Newlin
(74) *Attorney, Agent, or Firm* — Ewers IP Law PLLC; Falk Ewers

(57) ABSTRACT

A method for operating a microscopy system includes irradiating a region segment of a first region by a light source with light at a first wavelength λ1 and a first luminous intensity L1, determining a substance-specific parameter within the region segment as a response to being irradiated by the light source, and repeating the steps for all region segments within the first region. In addition, the disclosure (Continued)

relates to a microscopy system, and a calibration method for a microscopy system.

12 Claims, 5 Drawing Sheets

(56) References Cited

U.S. PATENT DOCUMENTS

2013/0181143 A1* 7/2013 Betzig ................ G02B 21/0032 250/459.1
2014/0368904 A1* 12/2014 Moertelmaier ........ G02B 21/06 359/385
2015/0053870 A1* 2/2015 Rumyantsev ...... G01N 21/6458 250/459.1
2016/0191910 A1* 6/2016 von und zu Liechtenstein ........... H04N 13/383 348/43
2019/0187461 A1* 6/2019 Dresser .............. G06K 7/10613
2019/0212268 A1* 7/2019 Querard ............. G01N 21/6458
2019/0269333 A1* 9/2019 Bodenschatz ........ G02B 21/361
2020/0081264 A1* 3/2020 Yamamoto ............. G02B 21/06
2021/0191228 A1* 6/2021 Gladnick ............. G02B 21/367
2022/0076809 A1* 3/2022 Beechem ............... G02B 21/16
2023/0280577 A1* 9/2023 Valdes ................. G02B 21/361 600/476

OTHER PUBLICATIONS

International Search Report dated February Jan. 24, 2023, of international application PCT/EP2022/064996 (on which this application is based) and English Language Translation thereof.
Nirmala Ramanujam, "Fluorescence Spectroscopy In Vivo", Article in Encyclopedia of Analytical Chemistry, (Sep. 15, 2006), pp. 1-37, ISBN: 978-0-47-002731-8.8, (John Wiley Sons, Ltd), University of Wisconsin, Madison, USA, in English.
Valdes et al., "Combined fluorescence and reflectance spectroscopy for in vivo quantification of cancer biomarkers in low- and high-grade glioma surgery", Journal of Biomedical Optics, www.SPIEDigitalLibrary.org/jbo, (Oct. 26, 2011), pp. (116007-1)-(116007-14), vol. 16(11), Paper 11233RR, SPIE, (DOI: 10.1117/1.3646916), Dartmouth College, Thayer School of Engineering, 8000 Cummings Hall, Hanover, New Hampshire, 03755, USA, in English.

* cited by examiner

METHOD FOR OPERATING A MICROSCOPY SYSTEM, MICROSCOPY SYSTEM, AND CALIBRATION METHOD FOR A MICROSCOPY SYSTEM

CROSS REFERENCE TO RELATED APPLICATIONS

This application is a continuation application of international patent application PCT/EP2022/064996, filed on Jun. 2, 2022, designating the United States, and claiming priority to German application 10 2021 205 727.6, filed on Jun. 7, 2021, and the entire content of both applications is incorporated herein by reference.

TECHNICAL FIELD

The disclosure relates to a method for operating a microscopy system, a microscopy system, and a calibration method for a corresponding microscopy system.

BACKGROUND

Surgical resection is an essential treatment step in the interdisciplinary management of brain tumors. The goal of the operation is to remove malignant tissue as completely as possible, while simultaneously sparing the nonpathological brain parenchyma. Brain tumors frequently infiltrate surrounding, nonpathological brain parenchyma. Functional tissue must be spared to the best possible extent to guard against neurological deficits. Resection is often not possible in eloquent areas in particular, promoting tumor recurrence. The resection is usually carried out with the assistance of specialized hardware (e.g., surgical microscope). The degree of resection is one of the most important prognostic factors in the surgical treatment of brain tumors and can be improved by administering contrast agents (e.g., 5-aminolevulinic acid/5-ALA). Following a preoperative administration of 5-ALA, PpIX accumulates selectively in the tumor and emits red fluorescence under blue light illumination (e.g., BLUE400™). The technology is established for high-grade tumors (WHO classification III and IV).

Low-grade gliomas (WHO classification I & II) and weakly infiltrated brain parenchyma often have low PpIX concentrations. These are often concealed in a background of spectrally overlapping autofluorescence of the parenchyma. Methods that are based on the measurement of the fluorescence intensity (e.g., BLUE400™) can therefore not distinguish between PpIX and autofluorescence.

A further technique for presenting malignant tissue, especially ex situ as well, is based on fluorescence lifetime imaging microscopy (FLIM). FLIM is a fluorescence-based imaging method from microscopy. In contrast to other fluorescence-microscopic methods, it is not based on a measurement of the fluorescence intensity but on the measurement of the different lifetimes of the excited states of fluorescing molecules. FLIM allows spectrally overlapping fluorophores to be distinguished based on their fluorescence lifetime.

Previous in vivo methods that draw on this technology are based on endoscopic systems with a restricted field of view (FOV). Visualization methods with increased field of view and working distance (WD) are required for the examination of relatively large regions. A more sensitive detection of the PpIX fluorescence is limited, inter alia, by tissue autofluorescence. A further technique uses spectrally resolved fluorescence imaging in order to identify invisible PpIX accumulations. However, this requires knowledge about, or the parallel measurement of, the optical tissue properties. This requires additional measurement channels, whereby these systems become more complex. Then again, fluorescence lifetime imaging (FLIM) is based on the time delay between the excitation and the subsequent fluorescence emission and is thus intrinsically independent of intensity variations on account of altered scattering or absorption in the tissue.

The fluorescence lifetime measured in FLIM emerges from the combination of all excited fluorophores. The lifetime of PpIX in organic solution is approx. 16.4 ns. If the measured lifetime is longer than the lifetime to be expected for autofluorescence (up to approx. 2 ns), it is possible to infer that PpIX has accumulated in the tissue.

The challenge now is to establish the FLIM method in clinical surroundings. Integrating this technology in a surgical microscope requires particular efforts and harbors a few obstacles.

For example, high laser power is required for the excitation of the molecules in order to better penetrate the tissue, thereby achieve a better signal-to-noise ratio and reduce the scan times. However, laser protection measures must also be considered at the same time: the eyes—as "most laser sensitive" organ of humans—of the users must be protected. Surgical instruments at the site or other metallic elements (clips, retractors, . . . ) may however lead to unwanted and uncontrolled reflections/scatterings of the laser into the surroundings. One protection option would consist in laser protection glasses being worn by all surgical staff. However, this is not practical in all situations (for example, if polarization glasses are already worn for digitally operating on a monitor) and would possibly also lead to a disturbance/lengthening of the surgical procedure since care also has to be taken that, for example, the floater—i.e., the person permanently going back and forth between operating theaters and stores to obtain required consumables—wears protective glasses when entering the operating theater.

Further, it is desirable and worthwhile to already be able to detect very low PpIX accumulations. As already mentioned, low-grade gliomas and weakly infiltrated brain parenchyma often have low PpIX concentrations. These are often concealed in a background of spectrally overlapping autofluorescence of the parenchyma. In order to be able to observe even lower PpIX accumulations, it is thus necessary to optimize the detection of low PpIX concentrations.

Further, the large working distances in neurosurgery, which are usually up to approx. 600 mm, and resultant small numerical apertures (NA) mean that high light losses are to be expected, since only a small part of the fluorescence can be collected. The photon budget is further reduced by safety requirements as described above. Thus, there is a trade-off between the following factors when integrating the FLIM method in a surgical microscope: size of the field of view, lateral resolution/number of scanned pixels, pixel dwell time/frame rate, accuracy of the lifetime measurement, required working distance/NA detection, maximum admissible laser power. Particular thought needs to be put into keeping the FLIM method short, and hence the irradiation times brief, while simultaneously placing great demands on the accuracy of the measurement. If a larger field of view is required, then this is only possible to the detriment of the scanning rate or the lateral resolution. Demands on the working distance and laser safety additionally have an influence on the photon budget. If one demand is satisfied, compromises must be made in the case of another demand.

Moreover, the very short fluorescence lifetimes render a calibration of the surgical microscope necessary since, otherwise, there is the problem that the measurements may be falsified. To determine the lifetime of the excited states, it is necessary to know the phase shift between the exciting laser light and the emitted fluorescence signal. As a result of the finite speed of light, the phase shift depends on electronic delays (e.g., lengths of cable) and the time of flight, which is to say the optical path, which the light traverses between excitation laser, sample/molecule, and finally to the detector, in addition to delays in the molecule itself (fluorescence lifetime). All phase shifts not caused by the fluorescence lifetime can be corrected by calculation for a reference working distance by virtue of a fluorophore with a lifetime in the excited state several orders of magnitude shorter than PpIX serving as a reference source and having its phase shift measured. The resultant phase shift is purely system-related and must be subtracted from the measured phase shift in all further measurements before the fluorescence lifetime is calculated. However, the assumption made here is that parameters such as the time of flight, for example, do not change for all further measurements. However, being able to flexibly adapt the working distance is desirable, especially in neurosurgery. What follows is an example for the effect on the measurement of the lifetime if the working distance is altered from 200 to 600 mm: In this case, the optical path changes by 800 mm, specifically from the excitation laser to the sample (400 mm) and from the sample to the detector (400 mm). Light traverses this path in 2.7 ns. This is a time of the order of the fluorescence lifetime to be measured. Thus, changes in the time of flight must be taken into account when calculating the fluorescence lifetime.

Lastly, as already mentioned above, brain tumors frequently infiltrate surrounding, nonpathological brain parenchyma. Functional tissue must be spared to the best possible extent to guard against neurological deficits. Resection is often not possible in eloquent areas in particular, promoting tumor recurrence. Alternative treatment methods for cytoreductive therapy are required intraoperatively to optimize the result of the surgical procedure linked with costs and risks. In dermatology in particular, light-based therapy (photodynamic therapy, PDT) is routinely applied to treat skin cancer. In the process, the patient is administered a photosensitizer which stimulates the production of reactive oxygen species under irradiation of light at a specific wavelength and with the presence of oxygen in the tissue. This leads locally to cell necrosis and may additionally trigger an immune response of the patient to the tumor. The PpIX used in the treatment of brain tumors in FLIM can also be utilized as a photosensitizer for PDT. To this end, the fluorescence-assisted resection is typically combined with subsequent PDT in the resection cavity. Previous techniques irradiate the resection cavity non-selectively as a whole, without making a distinction between malignant and nonpathological tissue. Especially in the case of Photofrin (accumulation in the tissue not strictly tumor-specific) as a photosensitizer, higher light doses were linked to unwanted effects as a result of the irradiation of nonpathological tissue. PpIX as a photosensitizer accumulates tumor-specifically, reducing the risk of neurological deficits.

SUMMARY

It is an object of the disclosure to avoid or solve some of the above-described problems when integrating the FLIM method in a clinical surgical microscope. This object is achieved by a method for operating a microscopy system, a microscopy system, and a calibration method for a microscopy system.

A first aspect of the disclosure relates to a method for operating a microscopy system, the method comprising the steps:

a. irradiating a region segment of a first region using a light source with light at a first wavelength $\lambda 1$ and a first luminous intensity L1;
b. determining a substance-specific parameter within the region segment as a response to being irradiated by the light source; and
c. repeating steps a) and b) for all region segments within the first region.

In this case, determining the substance-specific parameter includes both determination by measurement and estimation or calculation.

By dividing the first region, which may be the field of view of the microscopy system for example, into a plurality of region segments which are irradiated in succession and for which the substance-specific parameter is determined separately in each case, it is possible to ensure a sufficiently high irradiation intensity with the light from the light source within the region segments, independently of the area-related size of the first region.

In exemplary embodiments, fluorescence emitted by the region segment is detected for the determination of the substance-specific parameter. This can reduce photobleaching, which occurs otherwise. Moreover, it is possible to reduce or avoid an unnecessary radiation load on nonpathological tissue, which is to say healthy tissue, and local heating arising therefrom or to reduce or avoid the occurrence of phototoxic effects in nonpathological tissue, which is to say healthy tissue.

In exemplary embodiments, a further step of irradiating with light at another, second wavelength can be implemented. In this case, the second wavelength can be chosen such that malignant tissue becomes necrotic as a result of the irradiation with light at the second wavelength. In this case, the irradiation with light causes a production of a reactive oxygen species by the administered photosensitizer, leading locally to necrosis of the tissue. The disclosure then enables successive and repeated irradiation of malignant tissue.

In a further exemplary embodiment, each region segment is assigned to a first class or to a second class based on the determined substance-specific parameter. Typically, the classes assigned to the respective region segments are stored in a data memory.

The assignment to a first or second class can be performed for all region segments within the first region after steps a) and b) are repeated.

A region segment is assigned to a first class if the determined substance-specific parameter has predefined characteristics and is assigned to a second class if the determined substance-specific parameter does not have the predefined characteristics. Consequently, the first region is divided into two classes, with the region segments forming the elements of the two classes.

In a further exemplary embodiment, the above-described classification is followed by all region segments assigned to the first class being irradiated a second time using light at the first wavelength $\lambda 1$ and/or using light at a second wavelength $\lambda 2$. By re-irradiating the region segments using light at the first wavelength with a modified, in particular higher, luminous intensity or using light having a larger penetration depth into the irradiated tissue, it is possible to obtain information for the region segments of the first class regarding deeper depth regions of the tissue in these region segments without exposing the tissue in the region segments assigned to the second class to an additional radiation load.

In a further exemplary embodiment, all the previous steps may be repeated in order to reduce statistical errors in respect of the classification.

In a further exemplary embodiment, for example provided the disclosure is carried out using a robotic microscopy system, an angle of incidence of the light at the first wavelength λ1 and/or the light at the second wavelength λ2 may be variably specifically settable. As a result, individual region segments can be triggered in targeted fashion.

In a further exemplary embodiment, the light at the first wavelength λ1 and the light at the second wavelength λ2 traverse an identical beam path at least in a part of the microscopy system. This allows ensuring that the region segments classified as containing malignant tissue can be reliably processed in targeted fashion, which is to say that the points of incidence of light at the second wavelength λ2 are settable with sufficient accuracy, facilitating the handling of a system when performing the method. For example, a laser combiner can be used to input couple the light from two laser light sources into a joint beam path at an identical location and with an identical angle.

Hence, it is possible to minimize the exposure of nonpathological tissue and further be able to adapt the light dose in tissue-specific fashion. The selective irradiation enables dosimetric considerations which are made difficult in the case of nonselective irradiation. As a result of an automated PDT, it is possible to reduce treatment and surgery durations, whereby it is possible to reduce both risks to the patient and costs. It is thus highly relevant to initially make a distinction between malignant and nonpathological tissue and automatically treat nonresectable malignant tissue with PDT following a subsequent surgical resection.

In a further exemplary embodiment, an emitted radiation dose is determined during the second irradiation. Information about the radiation applied to or introduced into the tissue is available as a result, and a tissue-specific administration of the light dose is possible.

In a further exemplary embodiment, the second irradiation is terminated if the radiation dose applied to or introduced into the tissue exceeds a predefinable threshold dose. This protects the irradiated tissue by regulating the introduced radiation.

In a further exemplary embodiment, the radiation dose for the respective region segment during the second irradiation is displayed on a display apparatus. As a result, the user can gather information about the administered radiation dose and can perform checks regarding the region segments in which a further irradiation still is required or advantageous.

In a further exemplary embodiment, the region segments assigned to the first class can be subdivided into sub-region segments, and the second irradiation for each sub-region segment can be performed successively and repeatedly using light at the first wavelength λ1 and/or using light at the second wavelength λ2. This allows fractionation of the irradiation, and the light dose per light-tissue interaction duration can be optimized as a result.

In a further exemplary embodiment, an oxygen saturation within the first region is determined during the second irradiation. Hence, the radiation dose can be optimized, and the irradiation can be interrupted or terminated should the oxygen content in the tissue of the first region drop below a predefined threshold.

In a further exemplary embodiment, a first image of the first region is created before the region segment is irradiated for the first time, wherein, to create the first image, use is made of a recording apparatus and/or the steps are performed with a second luminous intensity L2, which is less than the first luminous intensity L1. The first image serves to detect reflective and/or scattering surfaces. To this end, the image signals of the first image are fed to a data processing unit embodied to divide the first image into critical, reflective or strongly scattering region segments and noncritical region segments. The pieces of position information relating to the critical region segments and the noncritical region segments are stored and output as a first image on the display apparatus. In the first image, the user can identify critical region segments, in which reflective or strongly scattering objects, for example surgical instruments, are located and can avoid an irradiation of these critical regions with strong laser light during the first and/or second irradiation by virtue of only implementing the second irradiation of these critical region segments, which are assigned to the first class, once the corresponding strongly scattering or reflective instruments have been removed from these regions.

In a further exemplary embodiment, a noncritical region segment is irradiated using light from the light source at the first luminous intensity L1 and/or a critical region segment is irradiated using light from the light source at a third luminous intensity L3. As a result, it can be achieved that only sections without reflective and/or strongly scattering objects are irradiated with a high luminous intensity. The second luminous intensity L2 and the third luminous intensity L3 may be defined as follows: $0\ W/m2 \leq L3 < L2$. As a result of different laser intensities, it can be achieved that reflective objects are irradiated only with very low intensity, or even with no intensity, and critical reflections are avoided as a consequence.

In a further exemplary embodiment, the identification and analysis of critical region segments is performed with at least one of the following methods: correlation, dense/non-dense feature extraction, artificial intelligence, machine learning, and/or image registration methods. A reliable determination of critical reflections is possible as a matter of principle using these methods.

In the case of the dense feature extraction, each picture element is viewed in a captured image. In the case of the non-dense feature extraction, by contrast, only representative picture elements are viewed in the captured image. Examples to be mentioned are the methods scale-invariant feature transform (SIFT), speeded-up robust features (SURF) and oriented FAST and rotated BRIEF (ORB). These methods are feature extractors and descriptors, which is to say they determine in a first step (key point extraction) characteristic picture elements in the image (e.g., edges and corners over different scales). These key points are then described by descriptors (a vector with numbers) (e.g., in the form of an analysis of picture elements in surroundings around the key point, for example as histograms, etc.).

In principle, it is also possible to additionally or alternatively use other methods of computer vision.

With artificial intelligence and/or machine learning, it is possible to train features and their description.

In a further exemplary embodiment, the critical region segments have a high reflection coefficient and the noncritical region segments have a low reflection coefficient.

In a further exemplary embodiment, the noncritical region segments adjacent to the critical region segments are irradiated using light from the light source at the third luminous power L3. As a result, safety zones are formed around the region segments identified as critical and these are likewise irradiated only with a low luminous intensity.

In a further exemplary embodiment, an observation light filter with a substance-specific transmission characteristic is used to detect the light serving to determine the substance-specific parameter. The detection of weak fluorescence can be optimized as a result.

In an exemplary embodiment, the observation light filter with the substance-specific transmission characteristic is embodied such that at least 95%, typically at least 98%, of the component of the light transmitted through the observation light filter is in a wavelength range from approximately 615 nm to approximately 740 nm, typically in a wavelength range from approximately 620 nm to approximately 660 nm. This optimizes the wavelength band of the detected light. In particular, the ratio between PpIX fluorescence and autofluorescence is maximized, which is advantageous especially in the case of a low PpIX fluorescence intensity.

Spectroscopic measurements are performed in an exemplary embodiment, with the results of the determination of the substance-specific parameters of the region segments being taken into consideration. Thus, the fluorescence evaluation is combined with a spectroscopic evaluation. This allows better identification of tumor edges, especially if the spectroscopic measurements are performed as point measurements.

In an exemplary embodiment, a second image of the first region is created based on the substance-specific parameters of the individual region segments, and a third image of a second region is created with a recording apparatus, wherein the first region and the second region are at least partly identical. The second and the third image are subsequently superimposed. In this case, the superimposition is initially implemented computationally by superimposing the image signals assigned to the second and third image. Subsequently, the image generated by superimposition of the second and the third image can be displayed (reproduced) on the display apparatus.

In an exemplary embodiment, the resolution of the second image is lower than the resolution of the third image. This provides advantages especially if the second image is a FLIM image because the spatial resolution of the FLIM images can be kept lower to avoid long image acquisition times. As a result, the field of view of the FLIM image can be increased or the scan rate for generating the FLIM image can be increased.

In an exemplary embodiment, topography data are additionally acquired with a topography sensor during the creation of the third image, said topography data likewise being superimposed with the second image. As a result, 3D information about the operating region (site) can be obtained and the information about the fluorescence lifetime within the operating region can be offered in 3D.

In an exemplary embodiment, the size of the first region and/or of the second region and/or the number of region segments are adapted for the purpose of generating a first overview image and/or a first detailed image, wherein the first overview image and/or the first detailed image are typically superimposed with the second image. In particular, an overall larger region can initially be scanned at a low resolution and partial regions of interest in the larger region can subsequently be scanned at a higher resolution. The image information obtained at a higher resolution can then be inserted in the partial regions of interest into an image which is generated outside of the partial regions of interest based on the image information obtained at a lower resolution and can then be displayed on the display apparatus as a superimposition image or composed image. In particular, the scan can be adjusted adaptively during measurements. In an exemplary embodiment, these measurements are based on the determination of the fluorescence lifetime.

In an exemplary embodiment, the second image and/or the third image are updated by repeating the respective steps to be performed to create the respective image, wherein the frequency of the repetitions defines an update rate corresponding to the respective image. The image is updated continuously during the surgery; the user has live images available and can react instantaneously to the current situation and to changes.

In an exemplary embodiment, the update rate of the second image is lower than the update rate of the third image. In particular, it is possible to perform the FLIM method with a significantly lower time resolution than the time resolution of recording images with the camera of the microscopy system and the topography sensor. The tissue within the operating region can be tracked in real time by the camera of the surgical microscope and the topography sensor, while the image information generated by the FLIM method is obtained at a significantly lower refresh rate. This can reduce the effect of photobleaching because the irradiation of the tissue by the strong laser light required for FLIM measurements is implemented less frequently.

Movements of the tissue in the field of view, which can be tracked with the aid of the third image, can be tracked with a tissue motion correction (e.g., block matching algorithm) to update the position of the measurement points in the second image in a manner corresponding to the movement of the tissue in the superimposed image. As a result, there can be a real-time visualization of the tissue even in the case of a low update rate of the second image.

In an exemplary embodiment, the second image is only updated if the first region and/or one of the region segments is spatially displaced and/or changes relative to the image information in the third image. The FLIM method is only performed anew if the operating field changes or if the user removes tissue from the site. In other cases, the positions of the measurement points in the second image relative to the third image can be updated in the superimposed image and, in the case of a lower time resolution of the FLIM method, movements of the site can be taken into account.

In an Exemplary Embodiment, i) the substance-specific parameter within the region segment is determined with a first sensor for creating a second overview image,
ii) a second irradiation of a region segment of the first region assigned to the first class is performed using light from the light source,
iii) the substance-specific parameter within the region segment assigned to the first class is determined with a second sensor for creating a second detailed image, and
iv) steps ii) and iii) are repeated for all region segments within the first region assigned to the first class.

In this case, the first sensor can be either the recording apparatus or a further light-sensitive camera.

In an exemplary embodiment, the second overview image is superimposed with the second detailed image. This allows a coarse overview map to be combined with image information at a high resolution in the region segments identified as relevant and corresponding combination images can be displayed on the display apparatus.

In an exemplary embodiment, the resolution of the second overview image is lower than the resolution of the second detailed image. In particular, this allows the spatial resolution of an areal FLIM recording to be reduced. Additional information can be recorded locally at a higher resolution by selective second FLIM recordings.

In an exemplary embodiment, the first sensor is embodied as an areal sensor. As a result, an overview map with a low resolution can be recorded relatively quickly by the areal sensor because the areal sensor is suitable for the simultaneous recording of measurement values at a plurality of measurement points. Areal sensors can be used to determine the fluorescence lifetime over large image regions. The integration of areal sensors in imaging systems allows parallelization of measurements and thus offers the potential of high-resolution wide-field imaging in real time. Technical advances in recent years have enabled such parallelized measurements for FLIM (e.g., time of flight/multi-tap cameras, single photon avalanche photodiode arrays—also referred to as SPAD arrays—cameras or embodied as a combination of a gated channel plate multiplier with a switched charge-coupled device (CCD) camera).

In an exemplary embodiment, the areal sensor is integrated in a surgical microscope of the microscopy system or attached to the surgical microscope. As a result, the sensor is always in reach and ready to use for the user, which is to say a surgeon, for example.

In an exemplary embodiment, the resolution of the second overview image is reduced with a binning method. As a result, the signal-to-noise ratio can be improved.

Currently, areal sensors for FLIM are still not sensitive enough for temporally and spatially highly resolved measurements in the case of weak signals, for example fluorescence lifetime imaging using a surgical microscope. Therefore, the second sensor can be embodied as a point sensor in an exemplary embodiment. Using a point sensor, it is possible to locally obtain information at a higher resolution about already identified malignant tissue. Such point sensors, which may for example be realized as handheld probes with an integrated measurement modality, have the required sensitivity for temporally and spatially highly resolved measurements even in the case of weak signals, quickly supply the user with information in the activity region, and are suitable for imaging of complex anatomies.

In an exemplary embodiment, the point sensor can be integrated in an apparatus arranged outside of the surgical microscope of the microscopy system. The point sensor can be held in the user's hand and thus be locally guided manually to the malignant tissue.

In an exemplary embodiment, the apparatus arranged outside of the surgical microscope of the microscopy system can be a handheld probe or an aspirator. Then, the point sensor may be integrated in an available surgical tool.

In an exemplary embodiment, device parameters (or equipment parameters) of the apparatus, selected from a group including an aspiration power and an ultrasonic fragmentation, are controlled based on the determined substance-specific parameter. The aspiration power and/or the ultrasonic fragmentation can be throttled or increased, depending on the classification of the corresponding region segment. In particular, the aspirator can be deactivated in region segments assigned to the second class, which is to say in the case of nonpathological tissue (no tumor cells).

In an exemplary embodiment, a camera integrated in the surgical microscope of the microscopy system can be used as recording apparatus.

In an exemplary embodiment, the substance-specific parameter is determined with the aid of a detector for detecting the light emitted as a response to the irradiation with the light from the light source. In this case, a photoelectron multiplier can be used as a detector, it allows a sensitive detection of emitted fluorescence and hence a low-noise determination of the fluorescence lifetime.

In an exemplary embodiment, the detector and/or the recording apparatus and/or the topography sensor and/or the first sensor and/or the second sensor are calibrated. As a result, the FLIM image can be superimposed more precisely with the image of the operating field recorded by the recording apparatus and the topography image.

In an exemplary embodiment, an assignment between the pixels of a recording region of the recording apparatus and the region segments of the first region of the first image and/or of the second region of the third image is performed when the recording apparatus is used. As a result, exact information in relation to the position of the reflective or strongly scattering objects can be ensured.

In an exemplary embodiment, the determined substance-specific parameter can be a fluorescence lifetime and/or a substance concentration of a fluorophore. As a result, a sensitive determination of specific tissue samples is possible.

In an exemplary embodiment, the determined substance-specific parameter for a region segment assigned to the first class is larger than the determined substance-specific parameter for a region segment assigned to the second class. This is especially the case if the substance-specific parameter is a fluorescence lifetime because malignant tissue has a longer fluorescence lifetime than nonmalignant tissue.

In an exemplary embodiment, the assignment to the first class and/or to the second class is implemented based on a comparison of the determined substance-specific parameter with a specified threshold value. Alternatively, the assignment to the first and second class can also be implemented by another computer-implemented classification method by evaluating the substance-specific parameter.

In an exemplary embodiment, the first image and/or the second image and/or the third image and/or the first overview image and/or second overview image and/or the first detailed image and/or the second detailed image are displayed on the display apparatus. The user can look at the scanned tissue on the display apparatus and check the positions at which malignant tissue is situated.

In an exemplary embodiment, the critical region segments within the first image are identified on the display apparatus. Then, on the display apparatus, the user can see the locations within the field of view at which reflective objects are situated and consequently see the locations at which there is no detailed information about the tissue in respect of malignant/nonmalignant status.

In an exemplary embodiment, the method includes the following further steps:

- storing the determined substance-specific parameter (in a data memory), and
- displaying the determined substance-specific parameter in the region segment on the display apparatus or a further display apparatus.

Based on the display of the substance-specific parameter in the region segments, the user can assess the positions in the field of view at which malignant tissue is situated and optionally can select regions of interest in which a spectroscopic measurement should additionally be performed in order to determine malignant tissue more precisely based on a combination of a substance-specific parameter determined from the spectroscopic measurement with a substance-specific parameter determined from a fluorescence lifetime measurement.

In an exemplary embodiment, the determined substance-specific parameter is displayed with a color code in the image displayed on the display apparatus. An appropriate color code allows high contrast visualization of different fluorescence lifetimes. Moreover, the region segments assigned to a first class or to a second class can also be displayed with a color code in the image displayed on the display apparatus.

In an exemplary embodiment, the color code is depicted logarithmically. As a result, the color contrast at short fluorescence lifetimes can be increased, with the result that both healthy tissue and malignant tissue can be displayed in a uniform color map.

In an exemplary embodiment, a focal depth of the surgical microscope can be set variably. As a result, malignant tissue at different depths of the observed tissue can be detected with improved accuracy.

In an exemplary embodiment, the superimposition of the second image and the third image and/or the superimposition of the second image and the third image with the topography data is calculated by a data processing unit or realized with the aid of color blending. As a result, the luminance of the camera image of the tissue structure can be maintained.

A further aspect of the disclosure relates to a microscopy system, including:

a surgical microscope;

at least one light source for irradiating a region to be examined;

a beam guiding unit for guiding, input coupling, and collimating a beam from the light source, wherein the beam guiding system includes a plurality of optical elements;

a control unit for controlling the optical elements in the beam guiding unit;

a detector and/or a recording apparatus for detecting the light emitted by the irradiated region to be examined;

a data memory; and a data processing unit;

wherein the beam guiding unit is configured to steer the beam from the light source in raster-like fashion over the region to be examined and to steer the light emitted by the irradiated region to be examined to the detector and/or the recording apparatus, wherein the data processing device is embodied such that the following steps are carried out using the beam from the light source:

a) irradiating a region segment of a first region using a light source with light at a first wavelength $\lambda 1$ and a first luminous intensity L1;

b) determining a substance-specific parameter within the region segment as a response to being irradiated by the light from the light source; and c) repeating steps a) and b) for all region segments within the first region.

The data processing device can further be embodied to carry out one or more of the method steps described above and/or the method steps yet to be described below.

An exemplary embodiment includes a modulator for the periodic modulation of the frequency of the intensity of the light from the light source. Further, the exemplary embodiment may include a lock-in amplifier to determine the signal of the detected light at the reference frequency of the modulator and hence obtain a signal-to-noise ratio improved by orders of magnitude. In particular, the modulator and the control of the modulator are configured to modulate the luminous intensity of the light from the light source with a frequency which is less than two orders of magnitude smaller than the mathematical reciprocal of the fluorescence lifetime to be measured. For example, if the fluorescence lifetime to be measured ranges between 1 and 20 ns, then the modulator is configured to modulate the amplitude of the light from the light source with a frequency in a frequency range between 5 MHz and 50 MHz.

In an exemplary embodiment, the light source is a pulsed laser or a fiber-coupled laser. If the light source is a pulsed laser, the microscopy system need not have an additional modulator. In the case of a laser diode as the light source, the modulator may also be realized by a modulated power supply for the laser diode.

In an exemplary embodiment, the focal depth of the surgical microscope is variably settable. As a result, different depths of the tissue can be scanned, and information can be accordingly obtained from different depths of the tissue.

An exemplary embodiment further includes a control unit configured to set the focal depth of the surgical microscope. Then, the user need not set the focal depth manually.

In an exemplary embodiment, the surgical microscope is controllable by a robot. Region segments in which malignant tissue was identified can be irradiated automatically from different angles and positions by a surgical microscope under robot control.

An exemplary embodiment further includes a display apparatus configured to display selected contents. Region segments in which malignant tissue was identified (region segments assigned to the first class) and region segments in which no malignant tissue was identified (region segments assigned to the second class) can be displayed differently to the user with high contrast on the display apparatus. Moreover, high-resolution images of the camera can also be displayed on the display apparatus.

An exemplary embodiment further includes an input apparatus configured such that a user using the microscopy system can control the apparatus. The user can home in on the malignant tissue manually in targeted fashion and can manually intervene in the irradiation process.

An exemplary embodiment additionally includes at least one sensor selected from a group including an areal sensor, a handheld sensor, a topography sensor, and an oxygen content sensor.

An exemplary embodiment further includes an evaluation unit configured to evaluate the at least one sensor selected from the group including the areal sensor, the handheld sensor, the topography sensor, and the oxygen content sensor.

In an exemplary embodiment, the detector is a photoelectron multiplier. A sensitive determination of fluorescence lifetimes is possible with a photoelectron multiplier.

In an exemplary embodiment, the detector and/or the recording apparatus and/or at least one sensor is integrated in the surgical microscope or attached thereto.

An exemplary embodiment additionally includes, upstream of the detector, an observation light filter in a detection beam path for the light emitted as a response to the irradiation by the light from the light source. The observation light filter is configured to pass light at a specific wavelength, the observation light filter typically being a bandpass filter. What can be achieved with the aid of the observation light filter is that only light relevant to the evaluation (fluorescence) passes the filter and reaches the detector, while other light, for example components of the autofluorescence, is filtered out before it reaches the detector. As a result, an increased signal-to-noise ratio can be achieved.

In an exemplary embodiment, the observation light filter has a transmission characteristic such that at least 95%, typically at least 98%, of the component of the light transmitted through the bandpass filter is in a wavelength range from approximately 615 nm to approximately 740 nm, typically in a wavelength range from approximately 620 nm to approximately 660 nm. This optimizes the wavelength band of the detected light. As already described further above, an observation light filter configured accordingly thus maximizes the ratio between PpIX fluorescence and autofluorescence in particular, which is advantageous especially in the case of a low PpIX fluorescence intensity.

In an exemplary embodiment, the detector and/or the spectrometer is connected to the surgical microscope via an optical fiber.

In an exemplary embodiment, the microscopy system includes a surgical microscope and a laser. The laser can be a laser diode with an emission wavelength of 405 nm. The laser can be connected to the surgical microscope via an optical fiber. A scanning device which is supplied with the light from the laser is arranged at the input of the illumination beam path of the surgical microscope. With the aid of the scanning device, it is possible, in targeted and computer-controlled fashion, to scan and/or position the laser in two mutually perpendicular directions over the field of view imaged by the surgical microscope.

In this exemplary embodiment, the laser diode is controlled in modulated fashion with a modulation frequency ranging from 5-50 MHz.

The surgical microscope includes a stereoscopic beam path with two stereoscopic component beam paths. For fluorescence lifetime measurements (FLIM measurements), the light from one or both of the stereoscopic component beam paths can be supplied in full to a detector via a mirror that can be switched into the component beam path. The detector can be connected to the relevant output of the surgical microscope via an optical fiber. The detector may be in the form of a photomultiplier.

For the phase-sensitive detection of the output signals of the detector, the system includes a lock-in amplifier, to which the output signals of the detector are supplied. The lock-in amplifier and the control for the laser diode are jointly triggered. For example, a trigger output signal of the lock-in amplifier can be used to control the power supply of the laser diode for the modulation thereof. As already described further above, the phase shift between the trigger signal and the detector signal can serve as a measure for the fluorescence lifetime and is therefore evaluated for obtaining a signal for the FLIM image.

The microscopy system may furthermore include a spectrometer which may be connected to the second stereoscopic component beam path of the surgical microscope. Either the spectrometer can be connected directly to the corresponding output of the surgical microscope or the light of the component beam path (or a part thereof) can be supplied to the spectrometer via a second optical fiber.

With the aid of the scanning device, it is possible to steer the laser beam in targeted fashion to predetermined locations within the field of view of the surgical microscope, and a respective spectrum of the fluorescence emission can then be recorded at these locations. To the extent that this is necessary on account of very weak fluorescence intensities, the output signals of the spectrometer may still be postprocessed, for example by the subtraction of background signals and filtering, for example Gaussian filtering.

According to an aspect of the description above, exemplary embodiments use image processing methods and/or methods for intelligent control of the scanning apparatus to optimize the efficiency and visualization of the FLIM method in a surgical microscope.

In a further exemplary embodiment, the data processing device of the microscopy system is embodied to carry out, or at least assist, a calibration method described below.

A further aspect of the disclosure relates to a calibration method for a microscopy system, including the steps:

specifying a first distance between the microscopy system and a region to be examined;

using light from the light source to irradiate a first substance within the region to be examined;

determining a first parameter Φ1 of the first substance based on the determined first distance;

determining a second distance between the microscopy system and the region to be examined;

determining a second parameter T1 and a third parameter T2 based on the second distance;

using light from the light source to irradiate a second substance within the region to be examined;

determining a fourth parameter Φ2 of the second substance within the region to be examined;

determining a fifth parameter τ based on the determined first parameter Φ1, the determined second parameter T1, the determined third parameter T2, the determined fourth parameter Φ2, and a frequency Ω.

In an exemplary embodiment of the calibration method, the length of the second distance is determined based on the first distance. The current distance can be compared directly to a reference distance, and hence the time to be compensated for can be determined immediately. Without the difference from the reference value, all further intrinsic time delays, determined for example by electronic delays or by light times of flight in the interior of the microscopy system, would have to be determined anew.

In an exemplary embodiment, the microscopy system includes a detector and the light source and the first distance is defined by the distance traversed by the light between the light source and the region to be examined and the second distance is defined as the distance traversed by the light between the examining region and the detector. This exactly defines the distance that must be traversed by the light.

In an exemplary embodiment, the determined first parameter Φ1 is a measured phase shift between the light from the light source which irradiates the first substance within the region to be examined and a light emitted by the first substance, resulting therefrom, within the region to be examined. Such phase shifts can be measured and processed further easily and accurately using lock-in technology.

In an exemplary embodiment, the determined second parameter T1 is the calculated time required by the light from the light source to traverse the determined second distance. This second parameter can easily be calculated with the aid of the difference between the reference distance and the modified distance when the speed of light is taken into account.

In an exemplary embodiment, the determined third parameter T2 is the calculated time required by light emitted by the second substance within the region to be examined, which was irradiated by light from the light source, to traverse the determined second distance. The aforementioned statement that the third parameter can easily be calculated with the aid of the difference between the reference distance and the modified distance when the speed of light is taken into account also applies here.

In an exemplary embodiment, a phase shift Φres resulting from the change from the first distance to the second distance is determined from the determined second parameter T1 and the determined third parameter T2.

In an exemplary embodiment, the determined fourth parameter $\Phi 2$ is a measured phase shift between the light from the light source which irradiates the second substance within the region to be examined and a light emitted by the second substance, resulting therefrom, within the region to be examined. This measured phase shift $\Phi 2$ can be compensated with the reference phase shift $\Phi$ which takes account of the electronic delays, etc.

In an exemplary embodiment, an determined fifth parameter $\tau$ is a corrected fluorescence lifetime of the second substance within the region to be examined. Based on a comparison of fluorescence lifetimes, it is directly possible to distinguish between malignant tissue and nonmalignant tissue.

In an exemplary embodiment, the light source—more precisely, the luminous intensity thereof—is modulated with a frequency $\Omega$. In particular, the frequency $\Omega$ can be less than two orders of magnitude smaller than the mathematical reciprocal of the fluorescence lifetime to be measured.

In an exemplary embodiment, the resultant phase shift $\Phi res$ is determined in accordance with the equation $\Phi res = \arctan((T1+T2)\, 2\pi\Omega)$ and/or the fifth parameter $\tau$ is determined by way of the equation $\tau = (\tan(\Phi 2 - \Phi 1 - \Phi res))/(2\pi\Omega)$. In this way, the measured phase shift is compensated taking account of the modified working distance and the intrinsic electronic delays, etc., for the purpose of calculating the actual lifetime.

Using the above-described calibration method, it is possible within a lifetime measurement based on the FLIM method to take account of phase shifts caused by a change in the optical path length.

In an exemplary embodiment, the reference value for the reference distance is determined by virtue of a substance known to have a fluorescence decay time of the order of a few picoseconds being used as first substance and the working distance being set to the reference distance. A resultant phase shift between the excitation signal and the detected FLIM signal is then determined exclusively by electronic delays and by light times of flight in the interior of the surgical microscope. In subsequent changes of the working distance, this change can be measured, and the resultant additional phase shift can be corrected automatically by virtue of taking account of the additional time of flight of the light over the modified working distance.

In an exemplary embodiment, the second distance is determined based on topography data measured with the aid of a topography sensor.

BRIEF DESCRIPTION OF THE DRAWINGS

The disclosure will now be described with reference to the drawings wherein.

DESCRIPTION OF EXEMPLARY EMBODIMENTS

Figure 1:
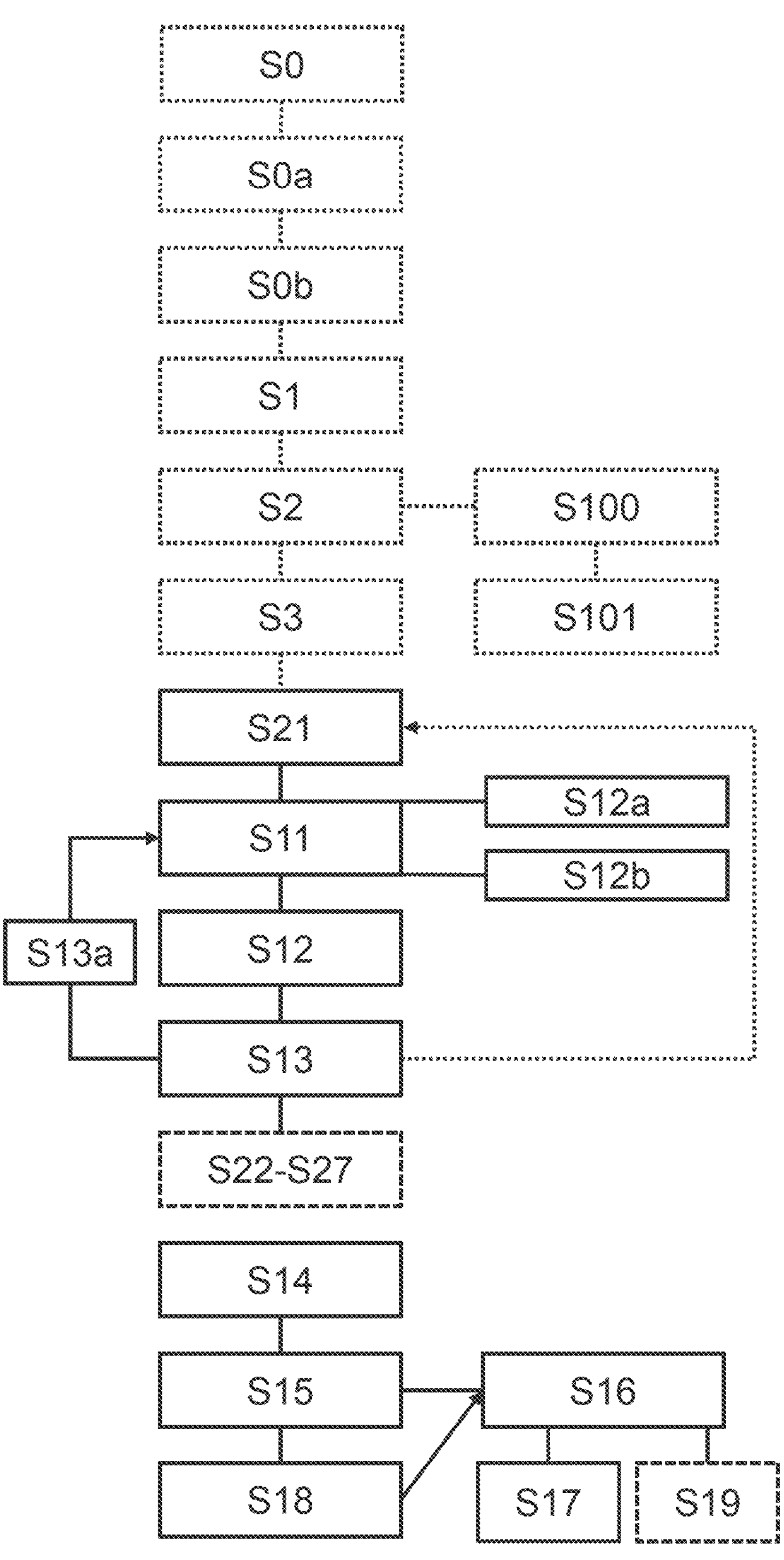
FIG. 1 shows a first flowchart of a method for operating a microscopy system according to a first exemplary embodiment of the disclosure.
Figure 4:
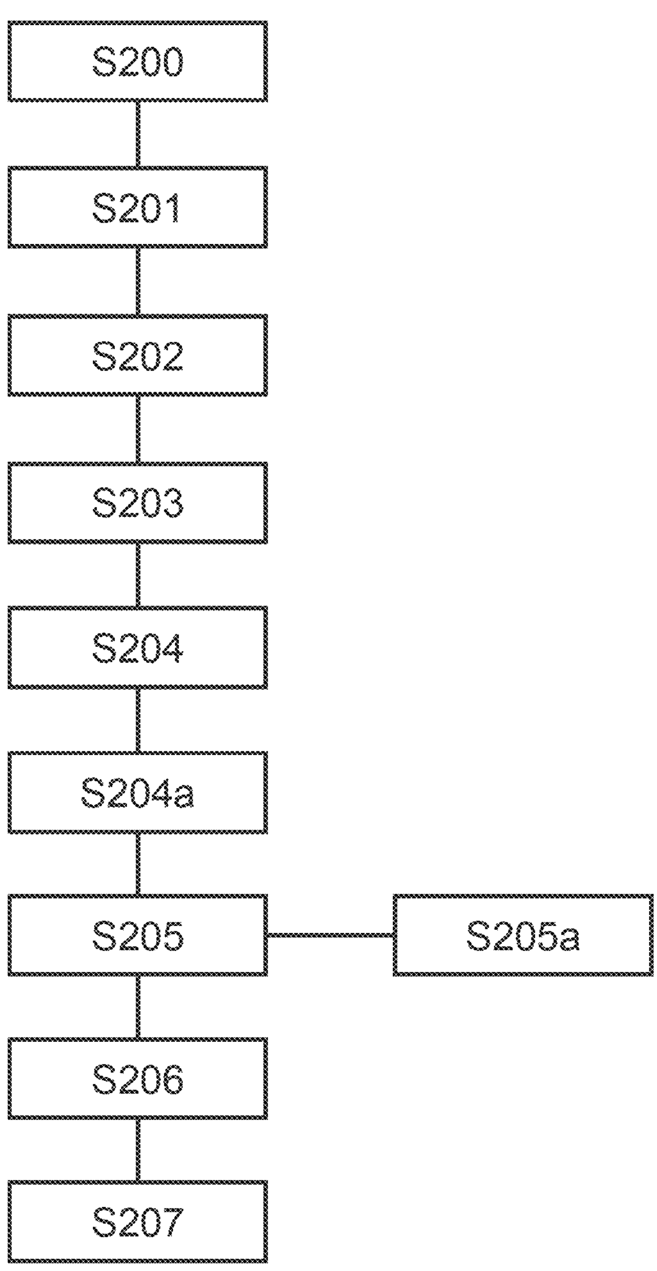
FIG. 4 shows a flowchart of a calibration method.

FIG. 1 shows a flowchart of a method for operating a microscopy system 100 which includes a fluorescence lifetime surgical microscope 1 according to a first exemplary embodiment the disclosure. In the case of the flowchart shown in FIG. 1, the actual measurement of the fluorescence lifetime starts with step S11, in which, initially, an individual region segment 30 of a first region, which represents a region 3 to be examined, is irradiated using a light source 2 which is in the form of a laser 20 in the exemplary embodiments shown. In this case, the light from the light source 2 is at a first wavelength $\lambda 1$ and has a first luminous intensity L1 and serves to excite a fluorescent dye situated in the region 3 to be examined. Then, in a step S12, a substance-specific parameter, specifically the fluorescence lifetime within the irradiated region segment 30, is determined as a response to the irradiation by the light source 2. According to an aspect of the disclosure, this is implemented by a detector 6, which may be in the form of a photoelectron multiplier 60. In this case, it is then possible—as indicated by step S12*a*—to use an observation light filter 15 for determining the substance-specific parameter, said observation light filter 15 being in the form of a bandpass filter 50 and having a substance-specific transmission characteristic and substantially only transmitting light from a narrow wavelength band between approximately 620 nm and approximately 660 nm. In the exemplary embodiment shown, it is moreover also possible to perform spectroscopic measurements in a step S12*b* while giving consideration to the results of the determination of the substance-specific parameters of the region segments 30, whereby the substance-specific parameter can once again be acquired with point accuracy on the examination object. Then, in a step S13, each region segment 30 is assigned to a first class or to a second class based on the determined substance-specific parameter. The classification as the first class and as the second class is implemented by specifying a threshold value. In this case, the region segments 30 which should subsequently be irradiated further and whose fluorescence lifetimes are at or above the threshold value are assigned to the first class. The classes assigned to the respective region segments 30 are stored in a data memory 7 here. As indicated by step S13*a*, steps S11 to S13 are then repeated for all region segments 30 within the first region, which represents the region 3 to be examined, to obtain pieces of information about the substance-specific parameter within the first region and hence ultimately obtain a map of the substance-specific parameter within the examined region 3. Moreover, an oxygen saturation within the first region is determined by a sensor 13—more precisely, by an oxygen content sensor 19—in step S14, whereby the light dose is optimized. In the exemplary embodiment shown, further steps S22 to S27, which are explained in more detail below based on FIG. 2, can be performed between step S13 and step S14. After there was a first irradiation with light at the first wavelength $\lambda 1$ and with the first luminous intensity L1 in step S11, there is a second irradiation of all region segments 30 assigned to the first class with light at the first wavelength $\lambda 1$ and/or with light at a second wavelength $\lambda 2$ in a step S15. An emitted radiation dose during the second irradiation is determined in step S16. The result of this determined radiation dose is then displayed in step S17 for the respective region segment 30 on a display apparatus 11. The second irradiation is terminated in step S19, as soon as the radiation dose exceeds a predefinable threshold dose. Alternatively, in step S18, the region segments 30 assigned to the first class can be divided further into sub-region segments, in which the second irradiation with light at the first wavelength $\lambda 1$ and/or with light at the second wavelength $\lambda 2$ is performed successively and repeatedly. In this alternative exemplary embodiment, the radiation dose emitted during the second irradiation in step S16 can likewise be determined. The result of this determined radiation dose can then be displayed in step S17 for the respective region segment 30 on a display apparatus 11. The second irradiation can be terminated in step S19, as soon as the radiation dose exceeds a predefinable threshold dose. Prior to the first irradiation, performed in step S11, there is the option in the illustrated exemplary embodiment of initially performing a calibration of the microscopy system 100 in step S0. This calibration method, which will still be described in detail below with reference to the flowchart depicted in FIG. 4, is performed on the detector 6 of the microscopy system 100 in particular in this case, to have, prior to the actual measurement, a one-time determination of system-related error sources, caused for example by electronic delays, for example on account of lengths of cable, and the time of flight caused by the finite speed of light, which is to say the optical path, and hence have these system-related error sources known during the actual measurement. However, it is equally provided within the scope of the disclosure for the calibration to be performed on a recording apparatus 16 or on the sensor 13, which is embodied as a topography sensor 17 and as the oxygen content sensor 19 in the exemplary embodiment shown or which, alternatively or else cumulatively, is embodied as a first sensor and as a second sensor, to improve the quality of the measurements. In this case, this calibration method does not need to be performed before each measurement, but when the microscopy system 100 is put into operation and within the scope of regular maintenance by the respective maintenance staff. Then, in step S0*a*, a focal depth of the surgical microscope 1 is selectively set in order to ultimately set the working distance and hence increase the accuracy with which the microscopy system 100 is operated. This setting of the focal depth can be specified by the user by way of an appropriate input and is realized with a control unit 10. Since the utilized light source 2 is the laser 20, there is the risk of the user being dazzled or even injured permanently if a laser beam emitted by the laser 20 is incident on a reflective or scattering surface. Therefore, it is advisable to initially create, in step S1 prior to the actual measurement in step S11, a first image of a first region representing or at least including the region 3 to be examined, to be able to detect possible reflections. To this end, it is possible either to use the recording apparatus 16, which is formed in the exemplary embodiments shown as a camera 18, or alternatively to irradiate all region segments 30 of the first region using the light source 2, to be precise with a second luminous intensity L2 which is lower than the first luminous intensity L1 used in step S11. Directly after the irradiation of the individual region segments 30, a respective substance-specific parameter, specifically the reflection, is acquired within the region segment 30 as a response to the irradiation using the light source 2. If the recording apparatus 16 was used in step S1 to detect the reflections, then the pixels of a recording region of the recording apparatus 16 are associated with the region segments 30 of the first region in step S1*a*. Then, in step S2, the first image is supplied to a data processing unit 8, to detect reflective or scattering surfaces within the region 3 to be examined. In this case, the data processing unit 8 divides the first image into critical region segments and noncritical region segments. Here, this division is made based on the factor as to whether reflective surfaces or objects are situated in the first image. As indicated in FIG. 1 by step S100, the first image can be displayed on the display apparatus 11. Then, the critical region segments are identified in this first image on the display apparatus 11, which is typically formed as a high resolution electronic visual display 21, in step S101, whereby the user can already detect at first sight the locations on the display apparatus 11 at which reflective objects are situated. As a result, it is possible by way of step S3 to set the luminous intensity in subsequent step S11. Thus, it is possible to specify in step S3 that noncritical region segments should be irradiated using the light source 2 at the first luminous intensity L1 in step S11 while critical region segments are irradiated using the light source 2 at a third luminous intensity L3, where the third luminous intensity L3 is lower than both the first luminous intensity L1 and the luminous intensity L2. Moreover, prior to step S11 in step S21, the size of the first region or of a second region and the number of region segments 30, which define the resolution, are initially adapted in step S21. With step S21, it is thus possible to quickly generate an overview image with a low resolution and/or to generate a detailed image of a small region with a higher resolution. In this case, steps S21 to S13 may optionally also be carried out multiple times in particular, to generate both a first overview image with a low resolution and a high resolution first detailed image.

Figure 2:
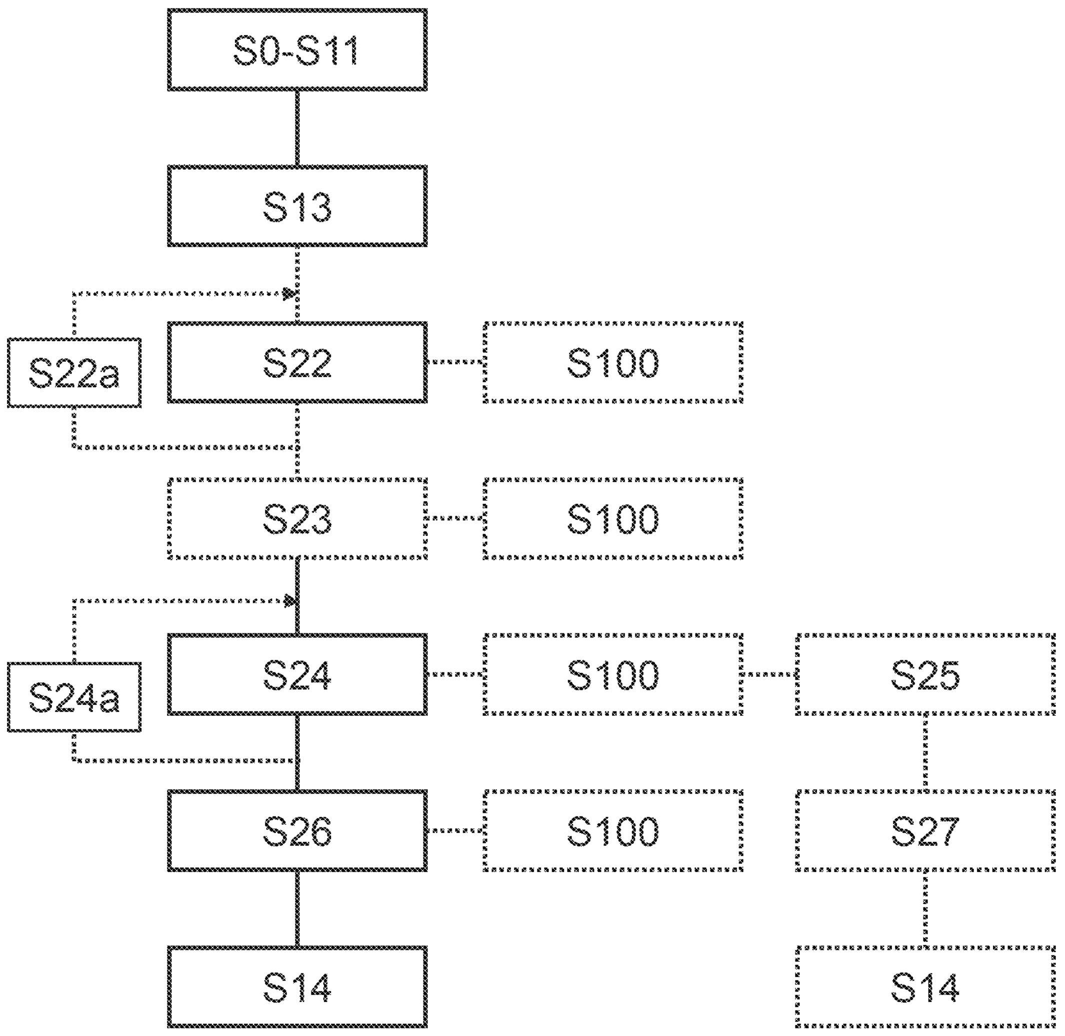
FIG. 2 shows a second flowchart of a detailed view of steps S22 to S27 from shown in FIG. 1.

FIG. 2 shows a further flowchart used to explain steps S22 to S27 in more detail, which are carried out between steps S13 and S14 in the flowchart shown in FIG. 1. In a further step S22, which follows step 13, a second image of the first region is initially created based on the substance-specific parameters of the individual region segments 30, which were acquired in steps S11 to S13. This second image is then displayed on the display apparatus 11 in step S100. As indicated in step S22*a*, the second image can be updated by repeating the respective steps required to create the image, wherein the frequency of the repetitions defines an update rate corresponding to the respective image. In a further, optional step S23, there then is a superimposition of a first overview image in the second image. Initially, the entire region is scanned at a low resolution and a region of interest is subsequently scanned at a higher resolution, whereby a further reduction of the scan rate or an enlargement of the image field is possible. This superimposed second image can then likewise be displayed on the display apparatus 11 in step S100. Then, in step S24, a third image of a second region is created by the recording apparatus 16, whereby it is possible to generate a high-resolution true color image. The first region and the second region overlap in the exemplary embodiment shown, which is to say they are at least partly identical. As indicated in step S24*a*, the third image is updated by repeating the respective steps required to create the third image, wherein the frequency of the repetitions defines an update rate corresponding to the third image. In step S26, the second image and the third image are superimposed and then—step S100 again—displayed on the display apparatus 11. As an alternative to step 26, the third image may then likewise be displayed on the display apparatus 11 after step S24, as indicated by step S100. During the creation of the third image, topography data are additionally acquired with the topography sensor 17 in step S25, and these topography data are superimposed with the second image in a step S27. Step S14 follows both step 26 and alternative step S27.

Figure 3:
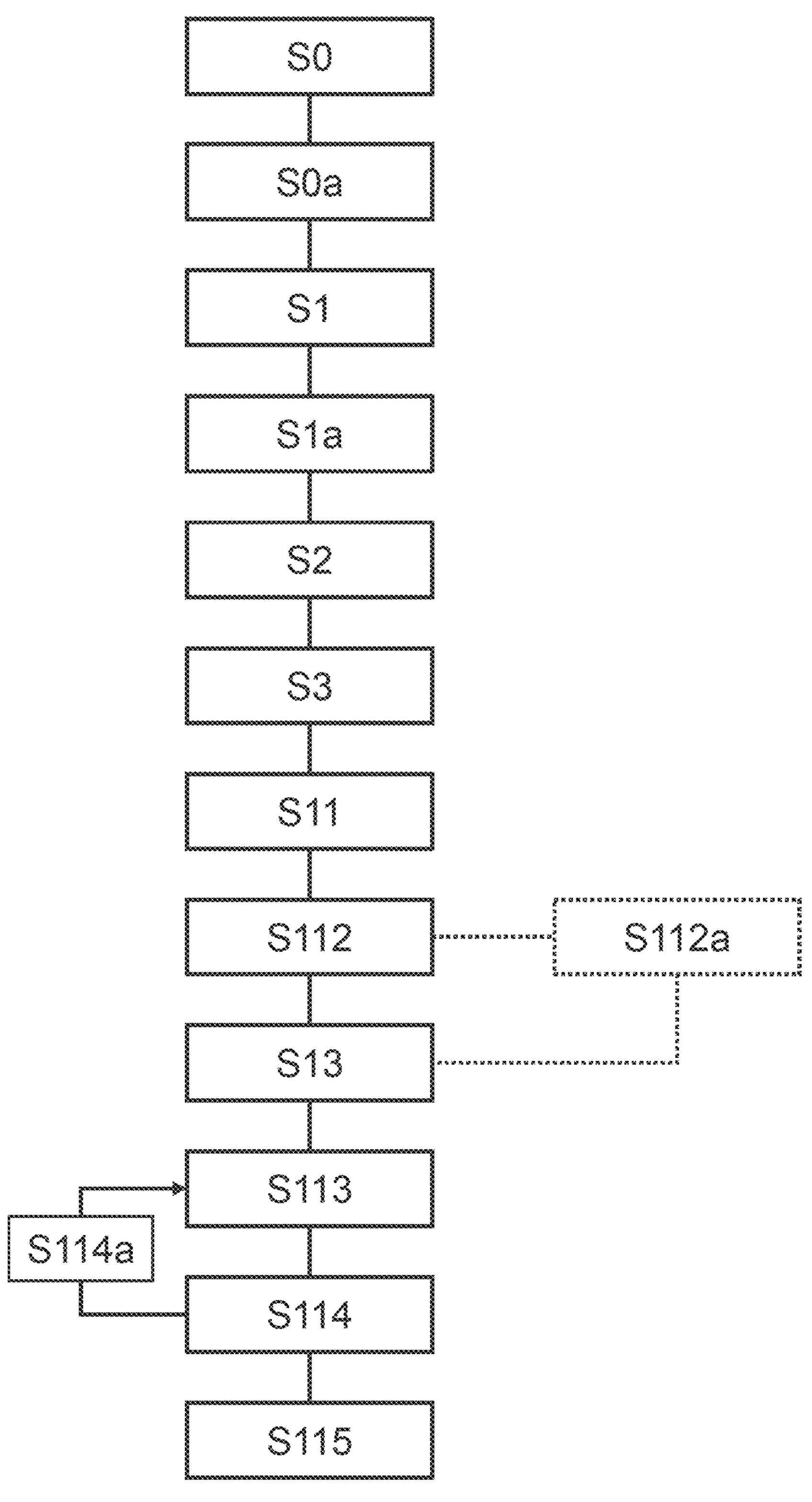
FIG. 3 shows a flowchart of the method according to a second exemplary embodiment of the disclosure.

In terms of the first steps S0 to S11, the second exemplary embodiment of the method according to the disclosure, the flowchart of which is shown in FIG. 3, does not substantially differ from the steps described above in the context of the first exemplary embodiment. In the second exemplary embodiment, step S11 is followed by step S112, in which a first sensor is used for determining the substance-specific parameter within the region segment 30 to create a second overview image. In this respect, an areal sensor is used as first sensor in the exemplary embodiment shown; it enables the simultaneous capture of the fluorescence lifetimes over a relatively large region, albeit at only a reduced resolution. To this end, the camera 18 of the recording apparatus 16 is used. In this case, the resolution of the second overview image is optionally reduced in step S112*a* with a binning method. In the second exemplary embodiment of the method according to the disclosure, too, each region segment 30 is assigned to the first class or to the second class based on the determined substance-specific parameter, specifically the fluorescence lifetime, in step S13. Moreover, the classes assigned to the respective region segments 30 are also stored in the data memory 7 in the exemplary embodiment shown in FIG. 3. If the region segment 30 is assigned to the first class, a region segment 30 of the first region assigned to the first class is irradiated a second time using the light source 2 in step 113. In step S114, the substance-specific parameter within the region segments 30 assigned to the first class is determined with a second sensor for creating a second detailed image. For example, a handheld sensor, typically integrated in a handheld probe or in an aspirator, may serve as a second sensor here. To complete the picture, steps S113 and S114 are repeated for all region segments 30 within the first region assigned to the first class, as indicated by step S114*a*. The second overview image obtained thus can then be displayed in superimposed fashion with the second detailed image on the display apparatus 11 in step S115, whereby an overview map with a low resolution is combined with one or more detailed views which have a high resolution. In other words, the second overview image is thus initially created with a low resolution and the region segments 30 grouped in the first class are then considered again—this time at a high resolution—to be able to then yet again create detailed images of these region segments 30. This superimposed image, which consists of the second overview image and the second detailed image or images, can now also be superimposed with a high-resolution true color image from the camera 18.

FIG. 4 shows a flowchart of steps of a calibration method for a microscopy system 100. On account of the short time durations that need to be measured, it is necessary to compensate for possibly present intrinsic electronic delays, to be able to determine the actual fluorescence lifetime. In this case, this calibration method initially includes, in step S200, the specification of a first distance A1 between the microscopy system 100 and a region 3 to be examined. Here, this first distance A1 serves as a reference distance. In a further step S201, light from the light source 2 is used to irradiate a first substance within the region 3 to be examined. This substance has a known, albeit very short fluorescence lifetime. A first parameter Φ1 of the first substance is determined in step S202 based on the determined first distance A1. Thereupon, in a further step S203, a second distance A2, which differs from the first distance A1, is determined between the microscopy system 100 and the region 3 to be examined. In this case, the first distance and the second distance are defined by the distance between the light source 2 of the microscopy system 100, the examined region and a detector 6 of the microscopy system 100 and ultimately thus represent the path that photons must traverse from the light source 2 to the region 3 to be examined and to the detector 6. In the exemplary embodiment shown, the length of the second distance A2 is determined based on the first distance A1, with the result that the current distance can be directly compared to the reference distance, and hence the time to be compensated for can be determined immediately. Topography data can additionally be given consideration for the more exact determination of the second distance A2. In this case, the determined first parameter Φ1 is a measured phase shift between the light from the light source 2 which irradiates the first substance within the region 3 to be examined and a light emitted by the first substance, resulting therefrom, within the region 3 to be examined. Then, in a step S204, a second parameter T1 and a third parameter T2 are determined based on the second distance A2. In this case, the second parameter T1 is the calculated time required by the light from the light source 2 to traverse the determined second distance, while the determined third parameter T2 is the calculated time required by light emitted by the second substance within the region 3 to be examined, which was irradiated by light from the light source 2, to traverse the determined second distance. In a further step S204*a*, a phase shift Φres resulting from the change from the first distance to the second distance is determined from the determined second parameter T1 and the determined third parameter T2 and calculated with the aid of the following formula $\Phi res=\arctan((T1+T2)\ 2\pi\Omega)$. In step S205, light from the light source 2 is then used to irradiate a second substance within the region 3 to be examined. In the calibration method according to an aspect of the disclosure, the luminous intensity of the light source 2 is modulated with a frequency Ω in a step S205*a*. Thereupon, in a step S206, a fourth parameter Φ2 of the second substance within the region 3 to be examined is determined. In this case, the determined fourth parameter Φ2 is a measured phase shift between the light from the light source 2 which irradiates the second substance within the region 3 to be examined and a light emitted by the second substance, resulting therefrom, within the region 3 to be examined. In a last step S207 of the calibration method, a fifth parameter τ is determined based on the determined first parameter Φ1, the determined second parameter T1, the determined third parameter T2, and the determined fourth parameter Φ2. In this case, the determined fifth parameter τ is a corrected fluorescence lifetime of the second substance within the region 3 to be examined and is calculated by $\tau=(\tan(\Phi 2-\Phi 1—\Phi res))/(2\pi\Omega)$. In the calibration method according to an aspect of the disclosure, the light source 2 is modulated with a frequency Ω which is close to the reciprocal lifetime of the excited state.

To measure FLIM in the frequency domain, the laser 20 is modulated with a specific frequency Ω (e.g., 10 MHz for PpIX). If the resultant fluorescence is detected using lock-in methods, the fluorescence lifetime τ can be back-calculated by way of the demodulated phase shift Φ between fluorescence and excitation ($\tau=(\tan(\Phi)/(2\pi\Omega))$). As a result of the finite speed of light, the phase shift Φ depends on electronic delays (e.g., lengths of cable) and the time of flight, which is to say the optical path, which the light traverses between laser 20, sample/molecule, and finally to the detector 6, in addition to delays in the molecule itself (fluorescence lifetime). For the reference working distance A1, all phase shifts not caused by the fluorescence lifetime can be corrected by calculation. To this end, the phase shift of a fluorophore which emits with a lifetime close to 0 ns in the respective spectral range (e.g., Allura red, τ~10 ps) is measured. The resultant phase shift is purely system-related and must be subtracted from the measured phase shift in all further measurements before the fluorescence lifetime is calculated. Moreover, however, the lengthened time of flight in the case of a changing working distance is taken into account by the method shown in FIG. 4. However, since the relationship between fluorescence lifetime and phase shift is nonlinear, the time of flight cannot be subtracted directly from the measured fluorescence lifetime. Rather, the phase shift caused by the time of flight is determined in an intermediate step. It is well known that $\Phi$=(arctan ($\tau$ToF $2\pi\Omega$) applies here as a matter of principle. In this case, $\tau$ToF is the additional time of flight caused by the change in the working distance. In the case of a specific example of an 800 mm change in the optical path, a time of flight of 2.67 ns emerges, and, resulting therefrom, a phase shift $\Phi$ of 9.51°. To correct this phase shift induced by the additional time of flight, use is made of the formula given above: $\tau$=(tan($\Phi$12−$\Phi$1−$\Phi$res))/($2\pi\Omega$).

Figure 5:
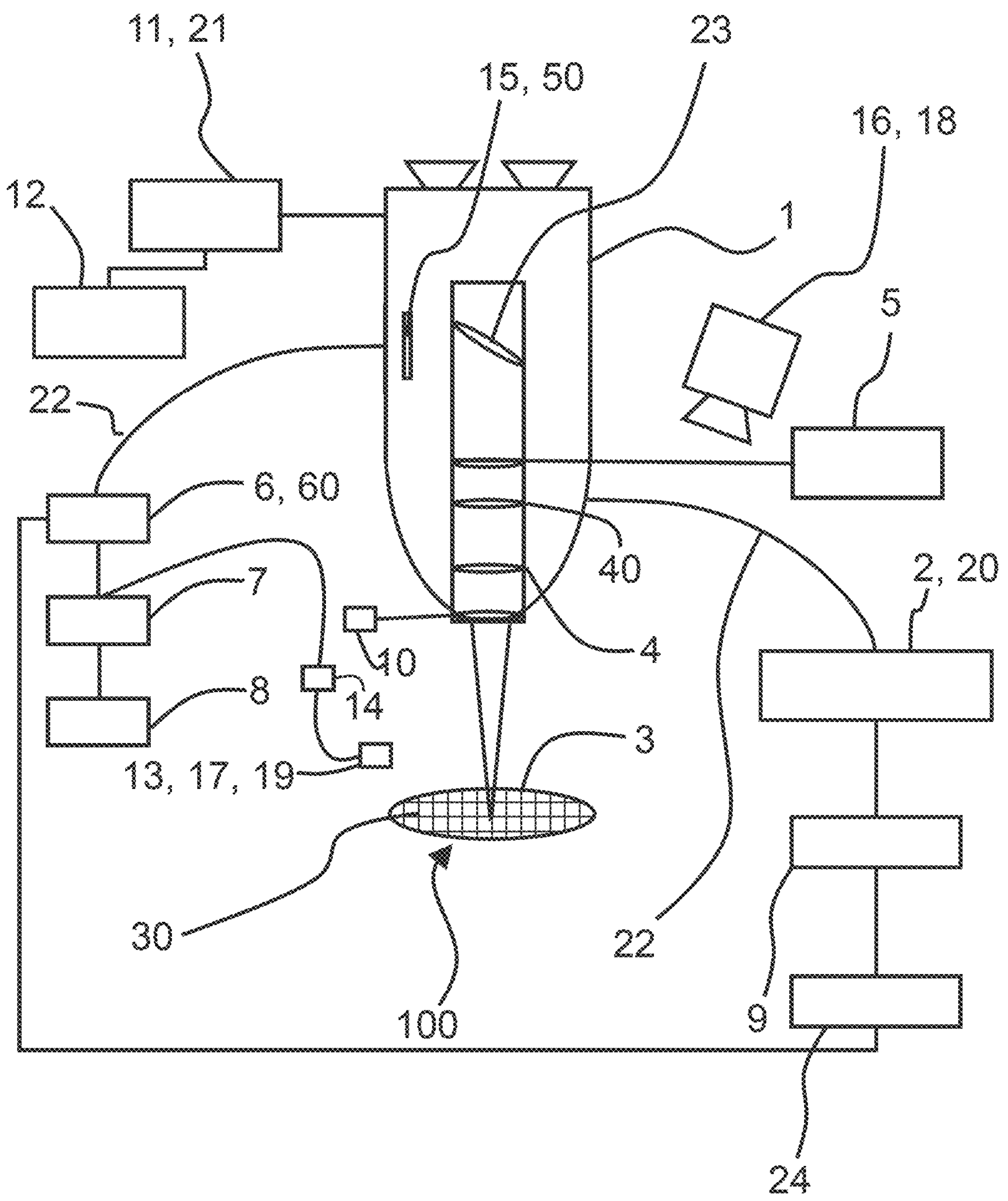
FIG. 5 shows a schematic diagram of a microscopy system.

FIG. 5 shows a microscopy system 100 in a schematic view according to an exemplary embodiment of the disclosure. In this case, this microscopy system 100 includes a surgical microscope 1 and a light source 2, for irradiating a region 3 to be examined. In the exemplary embodiment shown, the light source 2 is embodied as a laser 20, which is pulsed or fiber-coupled and suitable for exciting fluorescence molecules. In this case, the laser 20 includes a laser diode with an emission wavelength at 405 nm and is connected to the surgical microscope 1 via an optical fiber 22. Furthermore, the microscopy system 100 includes a beam guiding unit 4 for guiding, input coupling, and collimating the beam from the light source 2. Using the beam guiding unit 4, it is possible to steer the beam from the light source 2 in raster-like fashion over the region 3 to be examined. The beam guiding unit 4, which is also referred to as scanning device, includes a plurality of optical elements 40 in this case. Moreover, provision is made of a control device 5 which can be used to control the optical elements 40 of the beam guiding unit 4. The light from the laser 20 is supplied to the control device 5, which is arranged at the input of the illumination beam path of the surgical microscope 1. With the aid of the control device 5, it is possible, in targeted and computer-controlled fashion, to scan and/or position the laser 20 in two mutually perpendicular directions over the field of view imaged by the surgical microscope 1. In this case, the laser 20, or better its laser diode, is controlled in modulated fashion with a modulation frequency ranging from 5-50 MHz. Moreover, the exemplary embodiment shown provides for a detector 6 which is embodied as a photoelectron multiplier 60 in the exemplary embodiment shown. By way of this detector 6, it is possible to indirectly acquire the fluorescence lifetime via the measurement of the phase shift between exciting laser light and emitted fluorescence and with consideration being given to the above-described calibration method. Moreover, a recording apparatus 16 is provided. The recording apparatus can typically split the beam path of the surgical microscope 1. Moreover, a data memory 7 and a data processing unit 8 are provided. In this case, the beam guiding unit 4 assists with steering the light emitted by the irradiated region 3 to be examined to the detector 6 and/or to the recording apparatus 16, which is formed as a camera 18. Furthermore, the data processing unit 8 serves to enable an irradiation of a region segment 30 of a first region using the light source 2 with light at a first wavelength $\lambda 1$ and having a first luminous intensity L1. Moreover, determining a substance-specific parameter within the region segment 30 as a response to being irradiated by the light source 2 is achieved by the data processing unit 8. Ultimately, the data processing unit 8 also ensures that the aforementioned steps are repeated for all region segments 30 within the first region, which forms the region 3 to be examined. Moreover, a modulator 9 for modulating the frequency of the luminous intensity of the light source 2 is provided in the microscopy system 100. The focal depth of the surgical microscope 1 is settable to be able to scan different depths of the tissue. This setting of the focal depth can be specified by the user by way of an appropriate input and is realized with a control unit 10. Moreover, the surgical microscope 1 is controllable by a robot, whereby different angles of incidence of the light beam from the light source 2 can be realized in particular. The microscopy system 100 further includes a display apparatus 11, on which different images can be displayed individually or in combination—i.e., in superimposed fashion. Moreover, provision is made of an input apparatus 12, with which a user of the microscopy system 100 can control the apparatus. Moreover, the exemplary embodiment shown provides for a sensor 13 which is formed as a topography sensor 17 and as an oxygen content sensor 19 in the present case, for the evaluation of which an evaluation unit 14 is provided. In this case, the sensor 13 is attached to the surgical microscope 1. Moreover, an observation light filter 15 is provided to merely transmit light at a specific wavelength. In the exemplary embodiment shown in FIG. 5, the observation light filter 15 is formed as a bandpass filter 50 such that ultimately it is only relevant light that passes the filter, while other light is filtered out to ultimately improve the signal-to-noise ratio. In this case, the shown bandpass filter 50 has a transmission characteristic in which at least 95% of the component of the light transmitted by the bandpass filter 50 is between approximately 620 nm and approximately 660 nm. The surgical microscope 1 includes a stereoscopic beam path with two stereoscopic component beam paths. For fluorescence lifetime measurements (FLIM measurements), the light from one or both of the stereoscopic component beam paths can be supplied in full to the detector 6 via a mirror 23 that can be switched into the component beam path. The detector 6 can be connected to the relevant output of the surgical microscope via an optical fiber 22.

For the phase-sensitive detection of the output signals of the detector 6, the system includes a lock-in amplifier 24, to which the output signals of the detector 6 are supplied. The lock-in amplifier 24 and the control for the laser 20 are jointly triggered. For example, a trigger output signal of the lock-in amplifier 24 can be used to control the power supply of the laser 20 for the modulation thereof. As already described further above, the phase shift between the trigger signal and the detector signal can serve as a measure for the fluorescence lifetime and is therefore evaluated for obtaining a signal for the FLIM image.

It is understood that the foregoing description is that of the exemplary embodiments of the disclosure and that various changes and modifications may be made thereto without departing from the spirit and scope of the invention as defined in the appended claims.

LIST OF REFERENCE NUMERALS

1 Microscope
2 Light source
3 Region to be examined
4 Beam guiding unit
5 Control device
6 Detector
7 Data memory
8 Data processing unit
9 Modulator
10 Control unit
11 Display apparatus
12 Input apparatus
13 Sensor

14 Evaluation unit
15 Observation light filter
16 Recording apparatus
17 Topography sensor
18 Camera
19 Oxygen content sensor
20 Laser
21 Electronic visual display
22 Optical fiber
23 Mirror
24 Lock-in amplifier
30 Region segment
40 Optical elements
50 Bandpass filter
60 Photoelectron multiplier
100 Microscopy system
A1 First distance
A2 Second distance
S0 to S207 Method steps
T1 Time duration
T2 Time duration
Φ1 Phase shift
Φ2 Phase shift
Φ res Phase shift
Ω Modulation frequency of the luminous intensity

What is claimed is:

1. A microscopy system, comprising:

a surgical microscope;

at least one light source configured to irradiate a region to be examined;

a modulator configured to modulate an amplitude of a luminous intensity of light emitted by the at least one light source;

a beam guiding unit configured to guide, input couple, and collimate a beam from the at least one light source, the beam guiding unit including a plurality of optical elements;

a control device configured to control the plurality of optical elements in the beam guiding unit;

at least one of (i) a detector and (ii) a recording apparatus configured to detect the light emitted by the irradiated region to be examined, wherein the recording apparatus is arranged in the surgical microscope;

a data memory; and a data processing unit, wherein the beam guiding unit is configured to steer the beam from the at least one light source in raster-like fashion over the region to be examined and to steer the light emitted by the irradiated region to be examined to the at least one of (i) the detector and (ii) the recording apparatus, and wherein, with the beam from the at least one light source, the data processing unit is configured to:

(a) irradiate a region segment of a first region with the light emitted by the at least one light source at a first wavelength and the luminous intensity, wherein the amplitude of the luminous intensity is periodically modulated by the modulator at a modulation frequency, (b) determine a substance-specific parameter within the region segment as a response to being irradiated with the light from the at least one light source, and (c) repeat steps (a) and (b) for all region segments within the first region.

2. The microscopy system as claimed in claim 1, wherein the at least one light source is a pulsed laser or a fiber-coupled laser.

3. The microscopy system as claimed in claim 2, wherein a focal depth of the surgical microscope is settable.

4. The microscopy system as claimed in claim 3, further comprising:

a control unit configured to set the focal depth of the surgical microscope.

5. The microscopy system as claimed in claim 4, further comprising:

a display apparatus configured to display selected contents.

6. The microscopy system as claimed in claim 5, further comprising:

an input apparatus configured such that a user can control the apparatus with the microscopy system.

7. The microscopy system as claimed in claim 1, further comprising:

at least one sensor selected from a group consisting of an areal sensor, a handheld sensor, a topography sensor, and an oxygen content sensor.

8. The microscopy system as claimed in claim 7, further comprising:

an evaluation unit configured to evaluate the at least one sensor selected from the group consisting of the areal sensor, the handheld sensor, the topography sensor, and the oxygen content sensor.

9. The microscopy system as claimed in claim 7, wherein at least one of the detector, the recording apparatus, and the at least one sensor is integrated in the surgical microscope or attached to the surgical microscope.

10. The microscopy system as claimed in claim 6, further comprising:

an observation light filter configured to transmit light at a specific wavelength, wherein the observation light filter is a bandpass filter.

11. The microscopy system as claimed in claim 10, wherein the bandpass filter has a transmission characteristic such that at least 95%, or at least 98%, of a component of the light transmitted through the bandpass filter is in a wavelength range from approximately 615 nm to approximately 740 nm, or in a wavelength range from approximately 620 nm to approximately 660 nm.

12. The microscopy system as claimed in claim 1, wherein the modulation frequency is a frequency in the range between 5 MHz and 50 MHz.

* * * * *